United States Patent [19]
Herbert

[11] Patent Number: 4,921,445
[45] Date of Patent: May 1, 1990

[54] RAIL MOUNTING APPARATUS FOR ELECTRICAL COMPONENTS

[75] Inventor: William G. Herbert, Ellisville, Md.

[73] Assignee: Cooper Industries, Inc., Houston, Tex.

[21] Appl. No.: 337,805

[22] Filed: Apr. 14, 1989

[51] Int. Cl.⁵ .............................................. H01R 13/73
[52] U.S. Cl. .................... 439/532; 439/716; 248/221.4
[58] Field of Search ...................... 439/532, 716, 717; 248/214, 221.4, 231.4, 316.4

[56] References Cited
U.S. PATENT DOCUMENTS
4,067,529  1/1978  Milcoy .................. 439/716

Primary Examiner—Gary F. Paumen
Attorney, Agent, or Firm—Nelson A. Blish; Eddie E. Scott; Alan R. Thiele

[57] ABSTRACT

A rail mounting apparatus 10 comprising a spring clamp holder (20) and spring clamp (30). Rail mounting assembly (10) is attached to the bottom of a fuse block (52) and is used to clamp the fuse block (52) to a rail (50) such as a DIN rail in an electrical panel. Arms (36) on spring clamp (30) rests against tang (26) of spring clamp holder (20) so that arms (36) flex against tang (26) and rail clamps (32) and (28) grip the rail (50) mounted in the electric fuse panel.

6 Claims, 2 Drawing Sheets

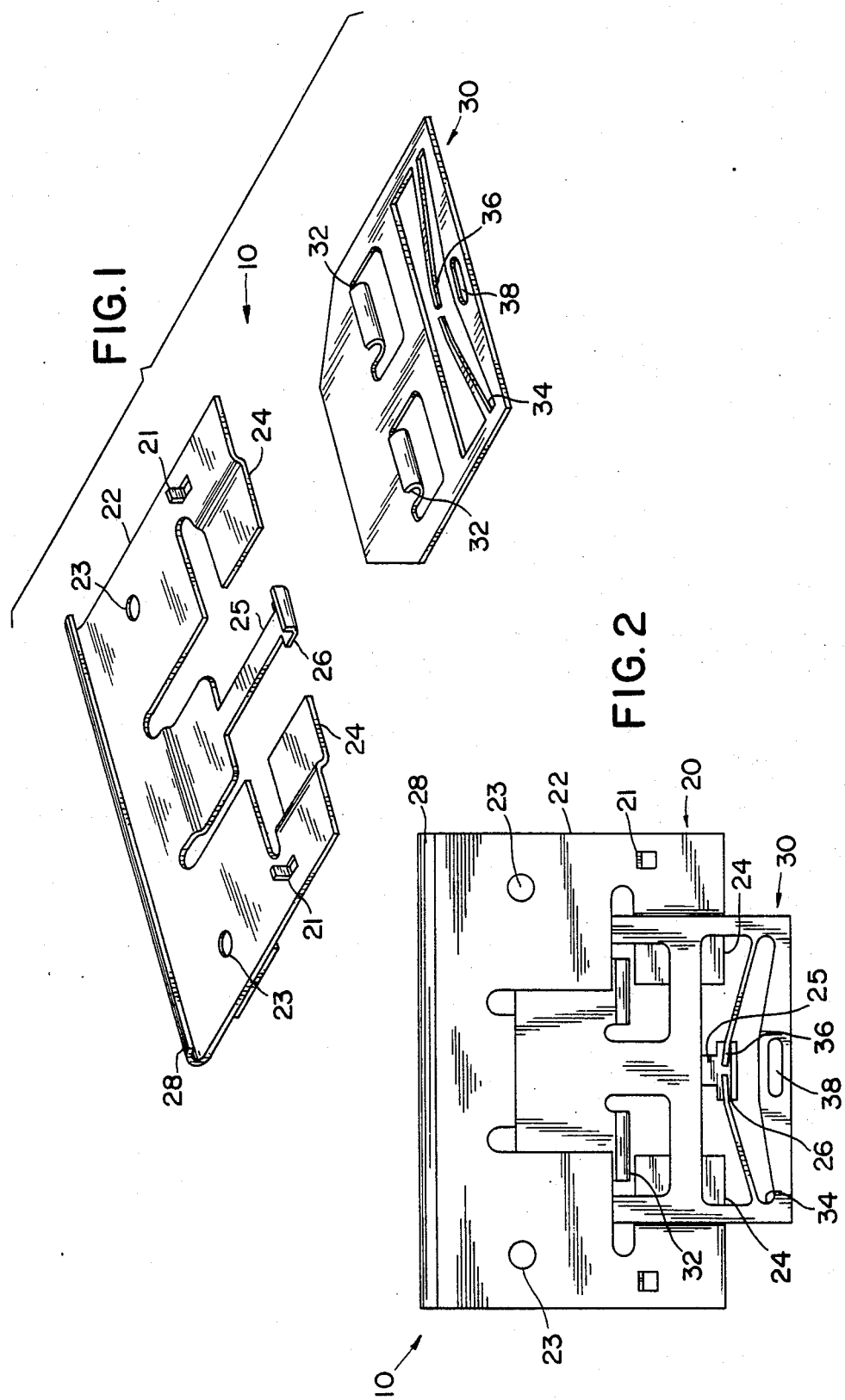

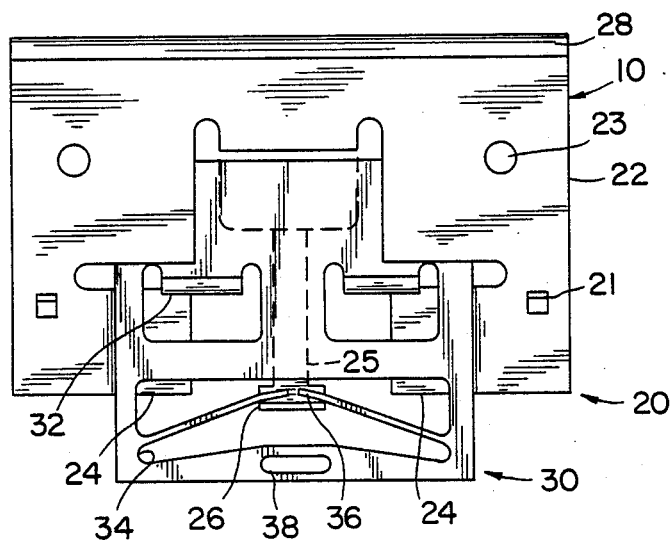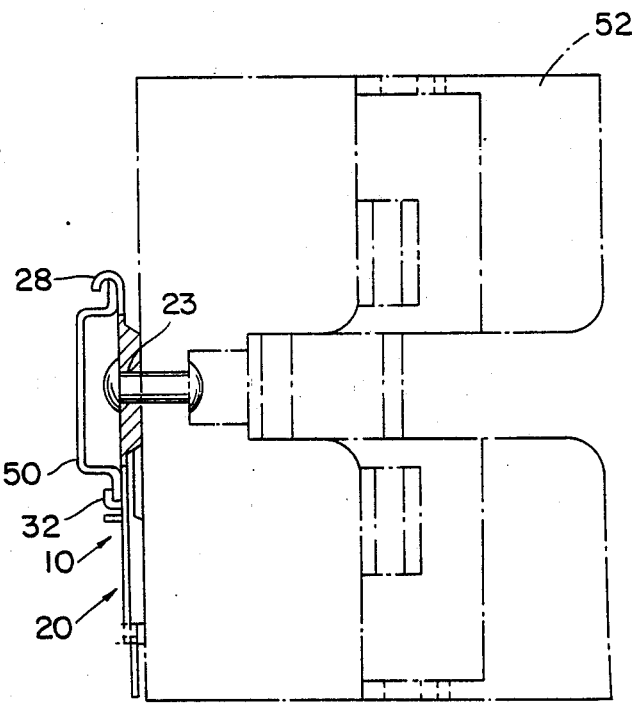

RAIL MOUNTING APPARATUS FOR ELECTRICAL COMPONENTS

BACKGROUND OF THE INVENTION

This application relates to fuse holders in general, and in particular to a fuse block having a rail mounting apparatus for attaching fuse blocks to a mounting rail in electric enclosures.

It is well known to mount fuse blocks in control panels for electrical equipment. A number of electrical enclosures or electric panels have incorporated a rail sometimes referred to as a DIN rail that fuse blocks may be attached to quickly and easily without use of assembly hardware and tools.

A problem encountered with larger fuse blocks is that the pulling, twisting or torque action commonly encountered when removing fuses from the fuse block will often damage the fuse block or dislodge the mounting apparatus from the rail. Thus, it is desirable to have a rail mounting apparatus that is sturdy, simple in construction and capable of being easily attached to the rail of the electric enclosures.

SUMMARY OF THE INVENTION

In the present invention a rail mounting assembly is comprised of two stamped pieces of metal, a spring clamp holder and a spring clamp. The spring clamp is held flexibly in position by the spring clamp holder so that it slides in a plane parallel to the holder.

BRIEF DESCRIPTION OF THE DRAWINGS

FIG. 1 shows a perspective view of a fuse rail mounting apparatus according to the present invention.

FIG. 2 shows a top view of the fuse rail mounting apparatus shown in FIG. 1.

FIG. 3 shows a top view of the fuse rail mounting apparatus shown in FIG. 2, in the retracted position.

FIG. 4 shows a front view of a fuse rail mounting apparatus attached to a fuse block and rail.

DETAILED DESCRIPTION OF THE INVENTION

A rail mount assembly according to the present invention designated generally by numeral 10, shown in FIG. 1, is comprised of two stamped plates one of which is positioned and retained by the other one.

The large piece, spring clamp holder 20, is made from flat material, such as metal suitable for stamping. Holder 20 is stamped to provide two mounting recesses 22, each with a thru hole 23, for receiving a screw, rivet, or similar hardware for affixing the device to a fuse block. Flat areas 24 and 25 are stamped to form surfaces parallel to the main surface of spring clamp holder 20, but approximately 0.05 inches lower than the main surface. A holding tang 26 extends vertically from center flat 25. Rail clamp 28 is a semi-circular channel and runs along the entire edge of the spring clamp holder 20. Two small stops 29 are lanced thru the spring clamp holder 20.

Spring clamp 30, is made from a springy, flat material, preferably metal, such as spring steel. Two clamping rails 32 are stamped into clamp 30 and form a "U" shaped channel. Clamps 30 along with clamp 28 grip rail 50. An elongated aperture 34 extends almost the entire width of the spring clamp 30 and contains two long, thin spring arms 36 which are attached to the spring clamp at opposite ends of the long aperture 34. The free ends of arm 36 nearly meet in the center of the aperture, but are separated from one another and are free to flex independently of one another. A smaller, elongated aperture 38, located on the vertical center line of spring clamp 30, but near the front edge.

To assemble the two rail clamp components, the holding tang 26 on the center flat area 25, is held down and spring clamp 30 inserted into the space formed between flat areas 24 and 25. The holding tang 26 is released and has sufficient memory to spring back to its original position which locates it on the vertical center line of the assembly. Spring arms 36 rest against tang 26.

FIG. 4 shows the rail clamp assembly 10 as it would be used on a fuse block 52. The rail clamp assembly 10 is fastened to the bottom of the fuse block 52 using rivets, eyelets, screws, or other fasteners which pass through the mounting holes of the fuse block 52 and through the mounting holes in the rail clamp assembly 10.

In operation spring clamp 30 is pulled in the direction shown in FIG. 3, the fuse block 52 is placed on the rail 50, and the spring clamp 30 is released, locking the assembly 10 to the rail 50.

It is desirable to have fuse blocks or other electromechanical devices constructed for mounting on a rail that could be used to mount a variety of components. As seen in the preceding paragraphs a fuse block, or other component having a rail mounting assembly according to the present invention, would snap onto the rail without the use of mounting screws, rivets, bolts, or similar hardware by the user.

I claim:

1. A rail mounting assembly for a fuse holder comprising:
   a spring clamp holder comprising;
     a main surface;
     a rail clamp for gripping a rail;
     two side flat areas at a level lower than the main surface of said spring clamp holder;
     a center flat area lower than the main surface of said spring clamp holder;
     a tang on said center flat area;
   a spring clamp which rests in said side flat areas and said center flat area of said spring clamp holder, said spring clamp comprising;
     a rail clamp for gripping said rail;
     spring arms which rest against said tang of said center flat area;
     said spring clamp being slideably mounted in said spring clamp holder so that movement of said spring clamp flexes said arms against said tang to return said rail clamps for gripping said rail.

2. A rail mounting assembly as in claim 1 wherein said spring clamp is comprised of spring steel.

3. A rail mounting assembly as in claim 1 wherein said spring clamp holder is metal.

4. A rail mounting assembly as in claim 1 wherein said side flats, center flat, tang, and rail clamp of said spring clamp holder are stamped.

5. A rail mounting assembly as in claim 1 wherein said arms and said rail clamp of said spring clamp are stamped.

6. A rail mounting assembly as in claim 1 wherein said spring arms flex independently of each other.

* * * * *